(12) United States Patent
Ishida

(10) Patent No.: US 7,880,803 B2
(45) Date of Patent: Feb. 1, 2011

(54) IMAGE PROCESSING APPARATUS AND IMAGE PROCESSING METHOD

(75) Inventor: Yoshihiro Ishida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/505,960

(22) Filed: Jul. 20, 2009

(65) Prior Publication Data

US 2009/0273689 A1 Nov. 5, 2009

Related U.S. Application Data

(62) Division of application No. 10/655,279, filed on Sep. 3, 2003, now abandoned.

(30) Foreign Application Priority Data

Sep. 3, 2002 (JP) .............................. 2002-258077
Jan. 22, 2003 (JP) .............................. 2003-013429

(51) Int. Cl.
*H04N 5/232* (2006.01)
*H04N 5/228* (2006.01)
(52) U.S. Cl. .................................... 348/345; 348/222.1
(58) Field of Classification Search .................. None
See application file for complete search history.

(56) References Cited

U.S. PATENT DOCUMENTS

| 4,544,254 A | 10/1985 | Egawa et al. |
| 4,786,987 A | 11/1988 | Fujimura et al. |
| 4,941,009 A | 7/1990 | Yoshida |
| 5,051,766 A | 9/1991 | Nonaka et al. |
| 5,319,403 A * | 6/1994 | Sakamoto et al. ........... 396/311 |
| 6,750,914 B2 | 6/2004 | Sannoh et al. |
| 7,286,160 B2 * | 10/2007 | Ejima et al. ............... 348/207.2 |
| 7,453,498 B2 * | 11/2008 | Prentice et al. .......... 348/222.1 |

FOREIGN PATENT DOCUMENTS

| JP | 10-210311 | 8/1998 |
| JP | 2001-167260 | 6/2001 |
| JP | 2002-112104 | 4/2002 |
| JP | 2002-305675 | 10/2002 |

* cited by examiner

*Primary Examiner*—Luong T Nguyen
(74) *Attorney, Agent, or Firm*—Cowan, Liebowitz & Latman, P.C.

(57) ABSTRACT

It is determined whether or not there is inconsistency between image sensing mode data, which is set by an operator with respect to a scene including an object of shooting, and attribute data, e.g., focal length data or the like, that accompanies an obtained image. When it is determined that there is inconsistency between the image sensing mode data and attribute data, a caution is given to the operator that it is necessary to maintain consistency.

7 Claims, 17 Drawing Sheets

FIG. 8

CAUTION!

CAMERA IS FOCUSED ON DISTANT VIEW,
BUT PORTRAIT MODE IS SET.
PLEASE CHECK THE MODE SETTING.

FIG. 9

CAUTION!
   CAMERA IS FOCUSED ON NEAR VIEW,
   BUT LANDSCAPE MODE IS SET.
   PLEASE CHECK THE MODE SETTING.

FIG. 15

CAUTION!

CAMERA IS FOCUSED ON DISTANT VIEW, BUT PORTRAIT MODE IS SET.

CONTINUE AS PORTRAIT — 601

CONTINUE AS LANDSCAPE — 602

FIG. 16

CAUTION!

CAMERA IS FOCUSED ON DISTANT VIEW,
BUT PORTRAIT MODE IS SET.

| END | CONTINUE | CONTINUE AS LANDSCAPE |

700　　　701　　　702

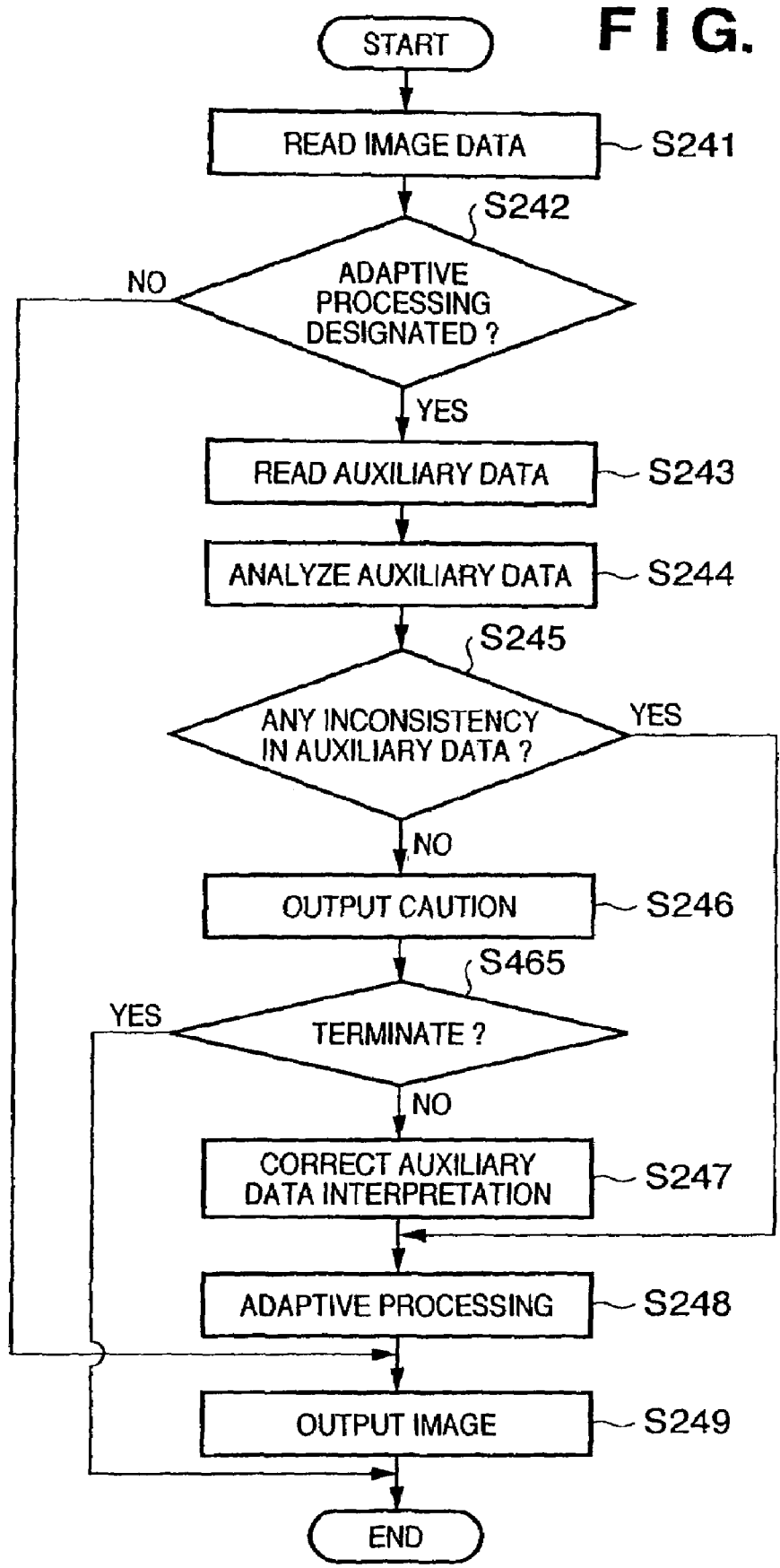

IMAGE PROCESSING APPARATUS AND IMAGE PROCESSING METHOD

CROSS-REFERENCE TO RELATED APPLICATIONS

This application is a divisional of application Ser. No. 10/655,279, filed Sep. 3, 2003 now abandoned the entire disclosure of which is hereby incorporated by reference.

FIELD OF THE INVENTION

The present invention relates to a technique of performing correction on an image, sensed by an image input device, e.g., a digital camera or the like, based on attribute data obtained at the time of image sensing.

BACKGROUND OF THE INVENTION

In recent years, there are increasing occasions to generate photograph images by sensing an image with a prevailing digital still camera and outputting the image with a color printer. Under such circumstance, lately image processing is becoming intelligent-oriented using attribute data or the like, which is given along with sensed image signals.

For instance, image processing apparatuses which perform image processing based on inputted image attribute data are known (e.g., Japanese Patent Application Laid-Open (KOKAI) No. 2001-167260 and 10-210311).

Japanese Patent Application Laid-Open (KOKAI) No. 2001-167260 (Document 1) states that it is desirable to execute appropriate processing (exposure correction) in accordance with data (image attribute data) related to an object of shooting in an image, rather than executing fixed correction processing without considering a characteristic of the object of shooting in the image. More specifically, according to Document 1, an image accompanied by image attribute data, e.g., whether or not the photograph should emphasize a "complexion" of a person, which is set in advance, is subjected to exposure correction with respect to the complexion of the person. This enables appropriate exposure correction with ease without darkening the person's face in the image, even if the person is photographed with a white wall on his/her background.

Japanese Patent Application Laid-Open (KOKAI) No. 10-210311 (Document 2) discloses a technique of executing appropriate processing by estimating an object of shooting in an image based on information related to a focal length obtained in image sensing, which accompanies the obtained image. More specifically, according to Document 2, if a focal point is on a distant view, the image is assumed to be a landscape and a soft spatial filter is used. If a focal point is on a middle distant view, the image is assumed to be a portrait. If a focal point is on an extreme near view, the image is assumed to be characters (document), and a sharp spatial filter is used and intense masking UCR processing is performed to improve quality of the characters.

However, the image attribute data accompanying an image, which is described in Documents 1 and 2, is not necessarily given as uniform data. Furthermore, it is not ensured that the attribute data is always appropriate for the image. For instance, assume that a distant view mentioned in Document 2 is sensed and the image is assumed to be a landscape. However, an erroneous operation may designate inappropriate attribute data, e.g., attribute of a portrait ("complexion" in Document 1), to the sensed image.

Meanwhile, recently rapidly prevailing digital cameras allow an operator to designate an image sensing mode, e.g., a portrait mode, a landscape mode, a nightscape mode, and so forth, by using a switch or a button provided on the camera main body. When a portrait sensing mode is set in a digital camera of this type, the image sensing condition is set in an aperture-priority exposure, automatically setting a rather shallow depth of field, so that while a person is in sharp focus, a background is in soft focus, throwing the background nicely out-of-focus. On the other hand, when a landscape sensing mode is designated, the camera is automatically set to achieve a rather deep depth of field, and camera processing is performed so as to achieve a rather high sharpness.

As described above, there is a possibility that image data accompanied by inconsistent attribute data may be subjected to unexpected inappropriate processing in the course of intelligent control achieved by adaptive processing of a printer, e.g., performing portrait adaptive processing on a landscape image.

In some cases, there is a possibility that an operator may perform image sensing with a mode that does not match the actual scene including an object of shooting. Particularly for an operator who is not familiar with a camera operation, the frequency of such erroneous operation tends to be high.

SUMMARY OF THE INVENTION

The present invention has been made in view of the above-described problems, and has as its object to provide a technique for preventing inappropriate processing and performing appropriate adaptive processing, even if an obtained image is accompanied by attribute data that is assumed to be inconsistent.

More specifically, in a case where it is determined that there is inconsistency between information regarding an image sensing mode, which is set by an operator with respect to a scene including an object of shooting, and attribute data that accompanies the obtained image, inappropriate processing caused by this inconsistency is prevented. Also, inappropriate processing is prevented in a latter occasion of utilizing the accompanying data.

In order to attain the above objects, the present invention provides an image processing apparatus which comprises image data acquisition means for acquiring image data, auxiliary data acquisition means for acquiring auxiliary data that accompanies the image data, condition checking means for checking whether or not there is an inconsistent condition in the auxiliary data acquired by the auxiliary data acquisition means and caution means for giving a caution in a case where the condition checking means determines that there is an inconsistent condition.

Furthermore, the present invention provides an image processing method comprises an image data acquisition step of acquiring image data, an auxiliary data acquisition step of acquiring auxiliary data that accompanies the image data, a condition checking step of checking whether or not there is an inconsistent condition in the auxiliary data acquired in the auxiliary data acquisition step and a caution step of giving a caution in a case where it is determined in the condition checking step that there is an inconsistent condition.

It is preferable in the above-described apparatus or method to further comprise image sensing condition input means (step) for inputting a condition at the time of acquiring the image data, and that the condition checking means (step) uses the image sensing condition, which is inputted by the image sensing condition input means (step), and a condition according to the auxiliary data, which is acquired by the auxiliary data acquisition means (step), in order to check whether or not there is an inconsistent condition in the auxiliary data acquired by the auxiliary data acquisition means (step).

Furthermore, it is preferable in the above-described apparatus or method that the caution given by the caution means (step) is realized by displaying a caution on a display screen.

Furthermore, it is preferable in the above-described apparatus or method to further comprise: image output means (step) for outputting the image data acquired by the image data acquisition means (step); and accompanying data output means (step) for outputting accompanying data which bases upon data obtained by the auxiliary data acquisition means (step) and/or the image sensing condition input means (step).

In the above-described apparatus or method, the auxiliary data is data related to a focal length acquired by the image data acquisition means (step), and the image sensing condition is data related to an image sensing mode.

Furthermore, in the above-described apparatus or method, the inconsistent condition indicates a case where the data related to a focal length specifies a short distance and the data related to an image sensing mode specifies an image sensing mode mainly provided for a long distance, or a case where the data related to a focal length specifies a long distance and the data related to an image sensing mode specifies an image sensing mode mainly provided for a short distance.

Furthermore, it is preferable in the above-described apparatus or method to further comprise adaptive processing means (step) for prompting a user to input data related to the auxiliary data in a case where it is determined by the condition checking means (step) that there is an inconsistent condition, and performing adaptive image processing on the image data in accordance with the inputted data.

Furthermore, it is preferable in the above-described apparatus or method to further comprise adaptive processing image output means (step) for outputting the image data, processed by the adaptive processing means (step), to a printer.

It is preferable in the above-described apparatus or method that in a case where the adaptive processing means (step) receives a data input from a user, the related auxiliary data is updated.

Furthermore, in the above-described apparatus or method, the inconsistent condition indicates a case where the data related to a focal length which is included in the auxiliary data specifies a short distance and the data related to an image sensing mode which is included in the auxiliary data specifies an image sensing mode mainly provided for a long distance, or a case where the data related to a focal length specifies a long distance and the data related to an image sensing mode specifies an image sensing mode mainly provided for a short distance.

Furthermore, the present invention also provides a computer program causing a computer to execute the above-described image processing method, and a computer-readable storage medium storing this computer program.

As set forth above, according to the present invention, auxiliary data that accompanies image data is checked, and if it is determined as a result of checking that there is an inconsistent condition in the auxiliary data, a cautionary notice is issued. Therefore, it is possible to prevent occurrence of inappropriate processing, and also possible to prevent occurrence of inappropriate processing in a latter occasion of using the auxiliary data.

Furthermore, according to the present invention, in a case where the auxiliary data includes an inconsistent condition, a cautionary notice is issued to an operator to prompt correction of the condition or termination of the processing.

Furthermore, according to the present invention, appropriate processing can be performed on image data in accordance with auxiliary data and a condition of adaptive processing which bases upon the auxiliary data. Therefore, the most appropriate output image can be obtained.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view showing a caution screen displayed on a display unit 2 in step S70 in FIG. 6;

FIG. 9 is a view showing a caution screen displayed on a display unit 2 in step S70 in FIG. 6;

FIG. 15 is a view showing an example of a caution display screen;

FIG. 16 is a view showing another example of a caution display screen; and

FIG. 17 is a flowchart showing an operation procedure according to a third embodiment of the present invention.

DETAILED DESCRIPTION OF THE PREFERRED EMBODIMENTS

Preferred embodiments of the present invention will now be described in detail in accordance with the accompanying drawings.

First Embodiment

Figure 1:
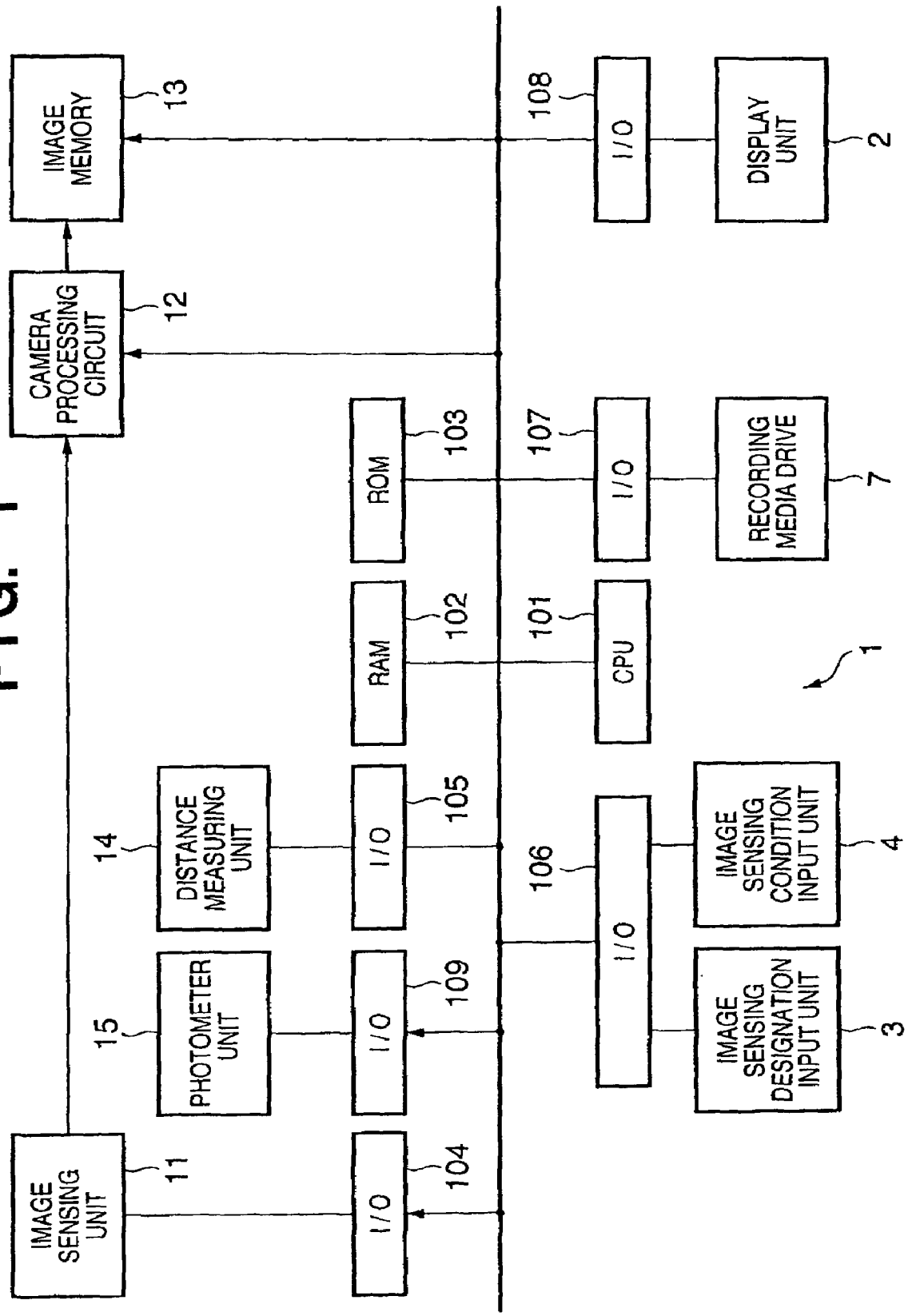
FIG. 1 is a block diagram showing a brief hardware construction of an image processing apparatus according to a first embodiment of the present invention.

FIG. 1 is a block diagram showing a brief hardware construction of an image processing apparatus according to the embodiment of the present invention.

According to the first embodiment, the image processing apparatus is applied to a digital camera 1.

Referring to FIG. 1, numeral 11 denotes an image sensing unit; 12, a camera processing circuit which performs image processing on image data; 13, an image memory; 104, an I/O used for controlling the image sensing unit 11 by a CPU 101; 14, a distance measuring unit which measures a distance from the digital camera 1 to an object of shooting; and 15, a photometer unit which meters luminance of a scene. An I/O 105 is an interface used by the CPU 101 for controlling the distance measuring unit 14. An I/O 109 is an interface used by the CPU 101 for controlling the photometer unit 15.

Numeral 3 denotes an image sensing designation input unit, e.g., a shutter release button; and 4, an image sensing condition input unit, e.g., an image sensing mode dial. The input units 3 and 4 are accessible by the CPU 101 through the I/O 106. Numeral 2 denotes a display unit connected to a system bus, which is connected with the CPU 101 and so on, via the I/O 108. Numeral 7 denotes a driving unit of a recording medium, e.g., Compact Flash (registered trademark), connected to a system bus, which is connected with the CPU 101 and so on, via the I/O 107.

Figure 2:
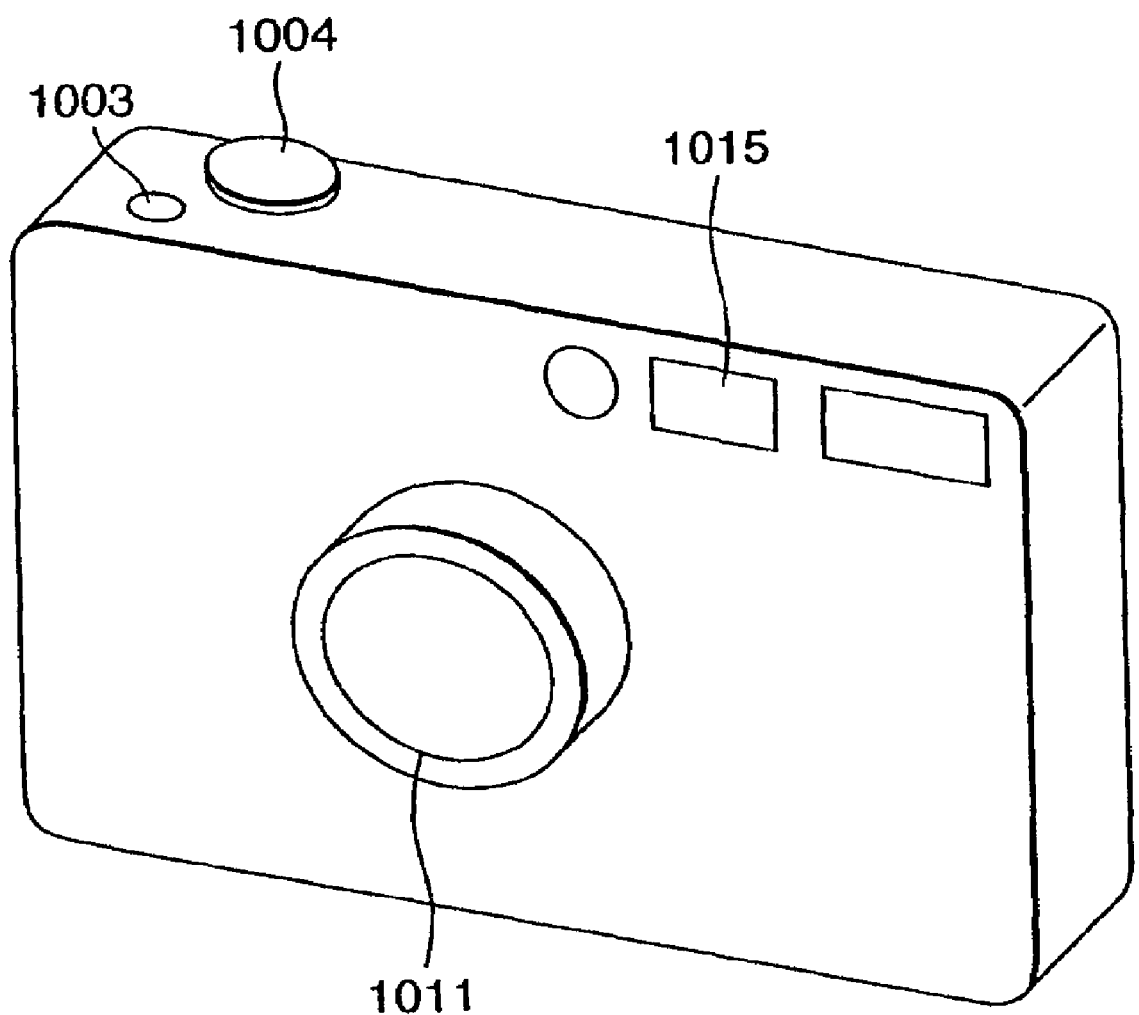
FIG. 2 is a perspective view showing an outer appearance of a digital camera 1 seen from an object of shooting.

FIG. 2 is a perspective view showing an outer appearance of the digital camera 1 seen from an object of shooting.

Referring to FIG. 2, numeral 1003 denotes a shutter release button, which constructs the image sensing designation input unit 3. Numeral 1004 denotes an image sensing mode dial, which constructs the image sensing condition input unit 4. Numeral 1011 denotes a lens, which constructs an optical system of the image sensing unit 11. Numeral 1015 denotes an autofocus flash reception window, which constructs the distance measuring unit 14.

Figure 3:
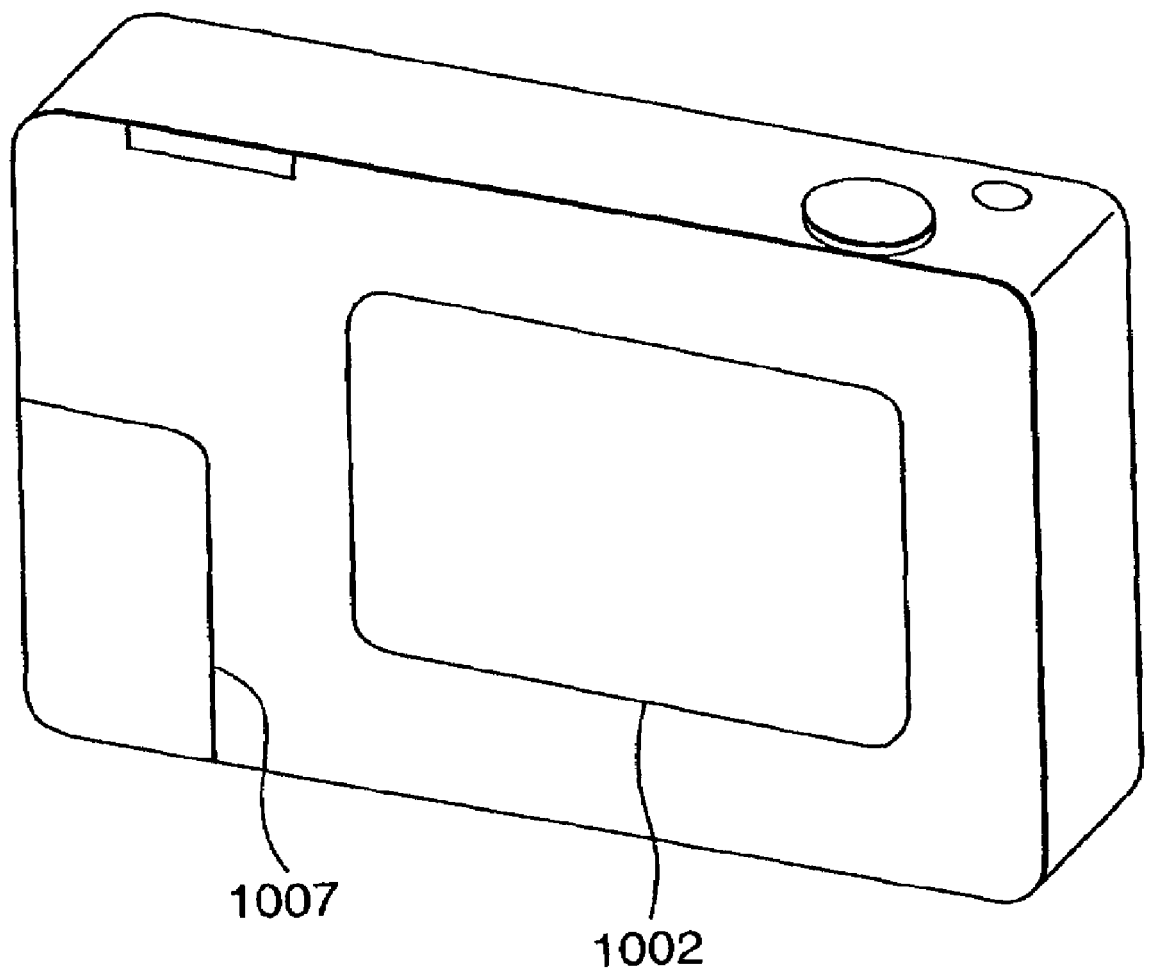
FIG. 3 is a perspective view showing an outer appearance of the digital camera 1 seen from a monitor screen side (opposite side of the lens)

FIG. 3 is a perspective view showing an outer appearance of the digital camera 1 seen from the monitor screen side (opposite side of the lens).

Referring to FIG. 3, numeral 1002 denotes a monitor screen of a display device, e.g., a liquid crystal panel. Numeral 1007 denotes a storage of a removable recording medium, e.g., Compact Flash (registered trademark), smart card and so on, and constructs an output unit of image data and auxiliary data (attribute data) thereof.

Figure 4:
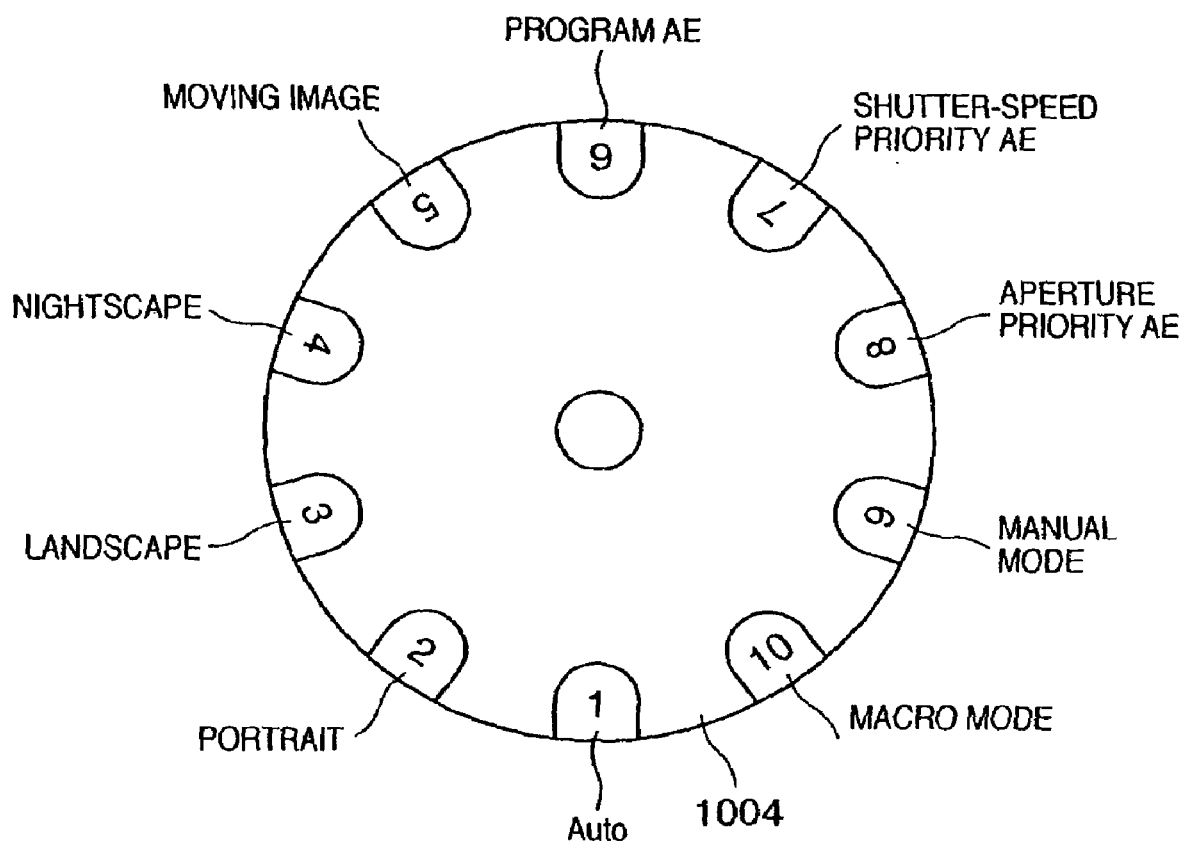
FIG. 4 is a brief view of an image sensing mode dial 1004 shown in FIG. 2.

FIG. 4 is a brief view of the image sensing mode dial 1004 shown in FIG. 2.

In FIG. 4, according to user's rotation operation of the image sensing mode dial 1004, the digital camera 1 is set in an Auto (automatic) mode at dial "1", a portrait mode at dial "2", a landscape mode at dial "3", a nightscape mode at dial "4", a moving image mode at dial "5", a program auto exposure (AE) mode at dial "6", a shutter-speed priority AE mode at dial "7", an aperture priority AE mode at dial "8", a manual mode at dial "9", and a macro mode at dial "10". A user sets one of these modes by rotating the dial 1004.

Figure 5:
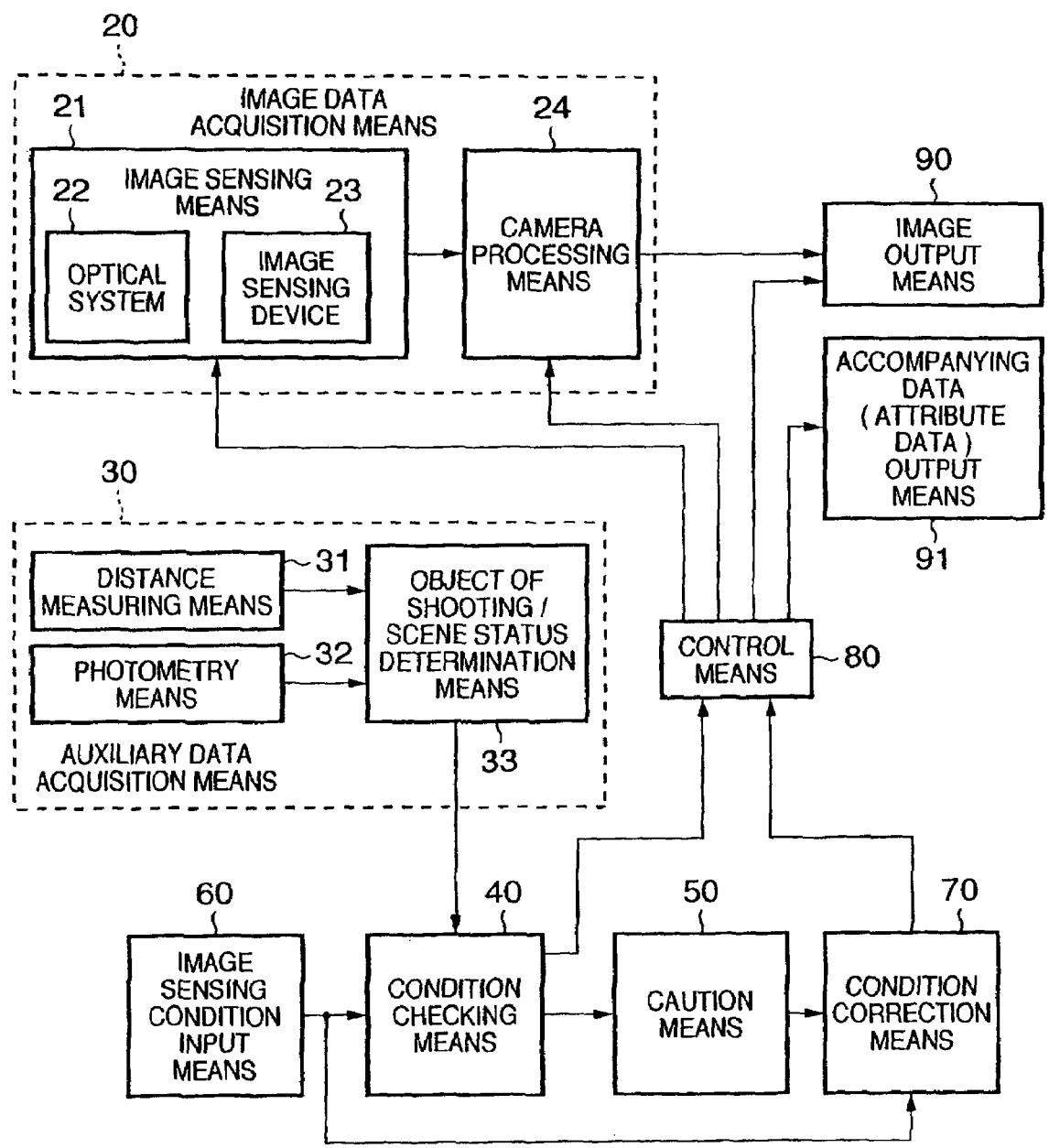
FIG. 5 is a block diagram showing functions of the image processing apparatus according to the embodiment of the present invention.

FIG. 5 is a block diagram showing functions of the image processing apparatus according to the first embodiment of the present invention.

In FIG. 5, image data acquisition means 20 comprises: image sensing means 21, which is constructed with a well-known optical system 22 configured with a lens and so on, and an image sensing device 23 configured with a photoelectric transducer, e.g., a CCD, CMOS or the like; and camera processing means 24 which generates image data by adaptively performing predetermined image processing (camera processing), e.g., gain correction, color balance adjustment, γ conversion or the like, based on an image sensing condition which will be described later, on an image signal obtained by sensing a scene including an object of shooting by the image sensing means 21. The image data acquisition means 20 acquires image data, which is obtained by sensing a scene including an object of shooting, as an input image. The image data acquired by the acquisition means 20 is outputted by image output means 90 later on.

Auxiliary data acquisition means 30 comprises: distance measuring means 31 which measures a distance from the digital camera 1 to an object of shooting; photometer means 32 which meters luminance of a scene including an object of shooting; and object of shooting/scene status determination means 33 which determines a status of an object of shooting and/or a scene based on information related to a (focal) distance from the digital camera 1 to an object of shooting that is obtained by the distance measuring means 31, and information related to luminance of the scene including the object of shooting that is obtained by the photometry means 32. The data regarding a (focal) distance from the digital camera 1 to the object of shooting and data regarding luminance of the scene including an object of shooting are outputted as auxiliary data to the condition checking means 40. Image sensing condition input means 60 inputs data regarding an image sensing mode or the like, which is obtained by designation/selection of an operator of the digital camera 1, by using operation means, e.g., a selection button or a dial switch of the digital camera 1 and outputs the data to the condition checking means 40.

The condition checking means 40 determines an existence/absence of a condition, in which auxiliary data obtained by the auxiliary data acquisition means 30 and image sensing mode data obtained by the image sensing condition input means 60 are assumed to be inconsistent. In other words, the checking means 40 determines whether or not the image sensing mode matches the state of the scene including an object of shooting. If the condition checking means 40 determines that there is no condition in which auxiliary data and image sensing mode data are assumed to be inconsistent, the most appropriate adaptive processing of the required image processing (camera processing), e.g., gain correction, color balance adjustment, γ conversion or the like, is set in the image data acquisition means 20.

If the condition checking means 40 determines that there is a condition in which auxiliary data and image sensing mode data are assumed to be inconsistent, caution means 50 gives a cautionary notice to an operator, prompting correction on the attribute data or the condition of the most appropriate adaptive processing. In response to the cautionary notice from the caution means 50, when the condition is corrected by an operator using the image sensing condition input means 60, condition correction means 70 corrects the attribute data or the condition of the most appropriate adaptive processing in accordance with a designation of the input means 60 made by the operator. Then, the most appropriate adaptive processing of the required image processing (camera processing), e.g., gain correction, color balance adjustment, γ conversion or the like, is set in the image data acquisition means 20. The corrected attribute data or the condition of the most appropriate adaptive processing is reflected upon the most appropriate adaptive processing of the required image processing (camera processing), e.g., gain correction, color balance adjustment, γ conversion or the like.

Based on the attribute data and the condition of the adaptive processing, the image data acquisition means 20 performs adaptive processing on the image data and obtains more preferable image data. Accompanying data, including the auxiliary data obtained by the auxiliary data acquisition means 30 and the image sensing condition obtained by the image sensing condition input means 60, as well as the attribute data are outputted by accompanying data output means 91.

The image data acquisition means 20 is constructed with the image sensing unit 11, I/O 104, camera processing circuit 12, and image memory 13 in FIG. 1. The image output means 90 and accompanying data (attribute data) output means 91 are constructed with the I/O 107 and recording media drive 7 in FIG. 1.

The auxiliary data acquisition means 30 is constructed with the distance measuring unit 14, photometry unit 15, I/O 105 and 109, and CPU 101 in FIG. 1. The image sensing condition input means 60 is constructed with the image sensing condition input unit 4 and I/O 107 in FIG. 1. The caution means 50 is constructed with the display unit 2 and I/O 108 in FIG. 1.

The condition checking means 40, condition correction means 70, and control means 80 are realized by the CPU 101, RAM 102, and ROM 103 in FIG. 1 operating in accordance with a process procedure according to the flowchart in FIG. 6 which will be described later.

Figure 6:
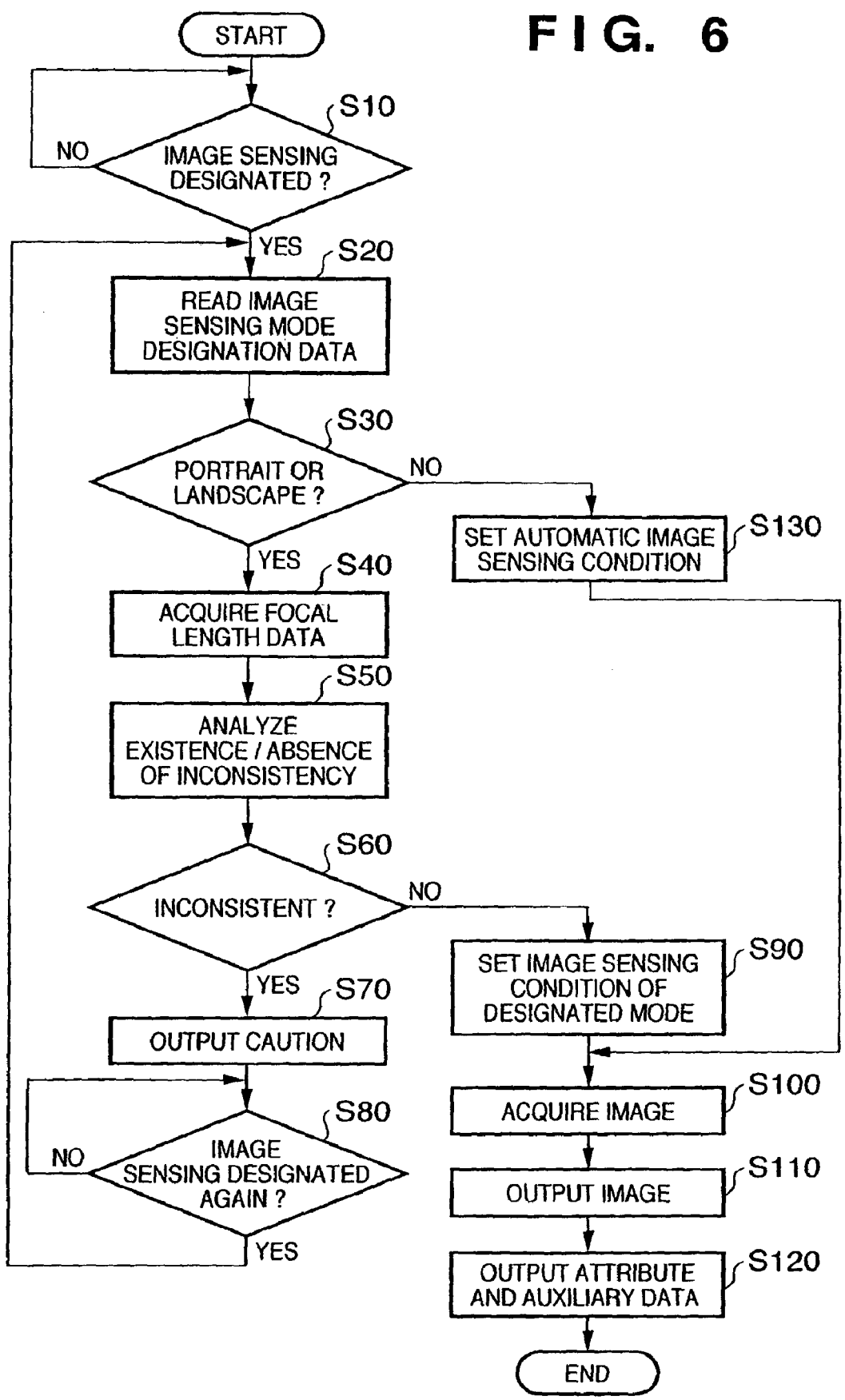
FIG. 6 is a flowchart describing a process procedure executed by the digital camera 1.

FIG. 6 is a flowchart describing a process procedure executed by the digital camera 1.

The process procedure is stored in advance in the ROM 103 as a program executable by the CPU 101, and executed by being sequentially read out of the ROM 103.

When the program is executed, it is determined through the I/O 106 whether or not an image sensing designation signal is inputted by the image sensing designation input unit 3, i.e., whether or not the image sensing designation unit (shutter release button 1003) is depressed (step S10). If NO, the determination is repeated. If YES, image sensing mode designation data, designated by the image sensing condition input unit 4 (i.e., image sensing mode dial 1004) is read and stored in the RAM 102 through the I/O 106 (step S20). Then, it is determined whether or not the image sensing mode designates a portrait mode or a landscape mode (step S30).

As a result of determination in step S30, if the image sensing mode designates a portrait mode or a landscape mode, data that accompanies the inputted image, such as a distance from the camera to an object of shooting, i.e., focal length data, is read from the distance measuring unit 14 through the I/O 105 (step S40).

The distance measuring unit 14, which can be constructed with the distance measuring means 31 in FIG. 5, determines a value (data) related to the (focal) distance from the camera to an object of shooting based on a predetermined threshold value (condition). In the first embodiment, if a focal length outputted by the distance measuring means 31 is 2 meters or less, it is determined that the focal length is a short distance (focused on a near view), otherwise it is determined that the focal length is a long distance (focused on a distant view). In step S40, information about either the near view or distant view is obtained as the focal length data, and stored in a predetermined area of the RAM 102, and the control proceeds to the next step.

Next, it is analyzed whether or not there is inconsistency between the focal length data read in step S40 and the image sensing mode designation data read in step S20 (step S50). If there is inconsistency, a flag indicative of inconsistency is set in a predetermined storage area of the RAM 102. If there is no inconsistency, the flag is reset, and the control proceeds to the next step. The analysis of existence/absence of inconsistency in step S50 will be described later.

Next, it is determined whether or not there is inconsistency between the focal length data and image sensing mode data by referring to the flag set/reset in step S50 (step S60). If there is inconsistency between the focal length data and image sensing mode data, a cautionary notice is displayed on the display unit 2 connected through the I/O 108, to warn an operator that there is inconsistency and that it is necessary to maintain consistency in the information, and also prompt the operator to input correction on the inconsistent image sensing mode designation (step S70).

FIGS. 8 and 9 show a caution screen displayed on the display unit 2 in step S70 in FIG. 6.

The caution screen warns an operator that there is inconsistency between the image sensing mode designation data inputted in step S20 and the auxiliary data inputted in step S40 and that it is necessary to maintain consistency in the information. Also, the caution screen prompts the operator to input correction on the inconsistent image sensing mode designation.

The aforementioned caution is not necessarily expressed by displaying a message on a display screen, but may be expressed by turning on or blinking a caution lamp having a distinctive color.

Upon completion of the processing in step S70, it is determined through the I/O 106 whether or not an image sensing designation signal is inputted by the image sensing designation input unit 3, i.e., whether or not the image sensing designation unit (shutter release button 1003) is depressed (step S80). If YES, the control returns to step S20. If NO, the determination is repeated.

As a result of the determination in step S60, if there is no inconsistency between the focal length data and image sensing mode data, image sensing is performed with a predetermined image sensing condition of the designated image sensing mode, i.e., the portrait mode or landscape mode. Then, the image data acquisition means 20 is set so as to perform predetermined camera processing (step S90). Based on the set image sensing condition and camera processing, the image data acquisition means 20 is driven to generate input image data (step S100). The input image data obtained by the image data acquisition means 20 is stored in the image memory 13.

The image data stored in the image memory 13 and obtained in step S100 is recorded in a recording medium by driving the recording media drive 7 through the I/O 107 (step S110). Data (attribute data) that accompanies the image data, which includes auxiliary data, e.g., image sensing mode data and focal length data, which are stored in a storage area (not shown) of the RAM 102, is recorded in the recording medium by driving the recording media drive 7 through the I/O 107 (step S120). By this, the series of processing ends.

As a result of the determination in step S30, if the designated image sensing mode is neither the portrait mode nor landscape mode, the image data acquisition means 20 is set in an image sensing condition of the Auto (automatic) mode or nightscape mode, and the control proceeds to step S100.

Figure 7:
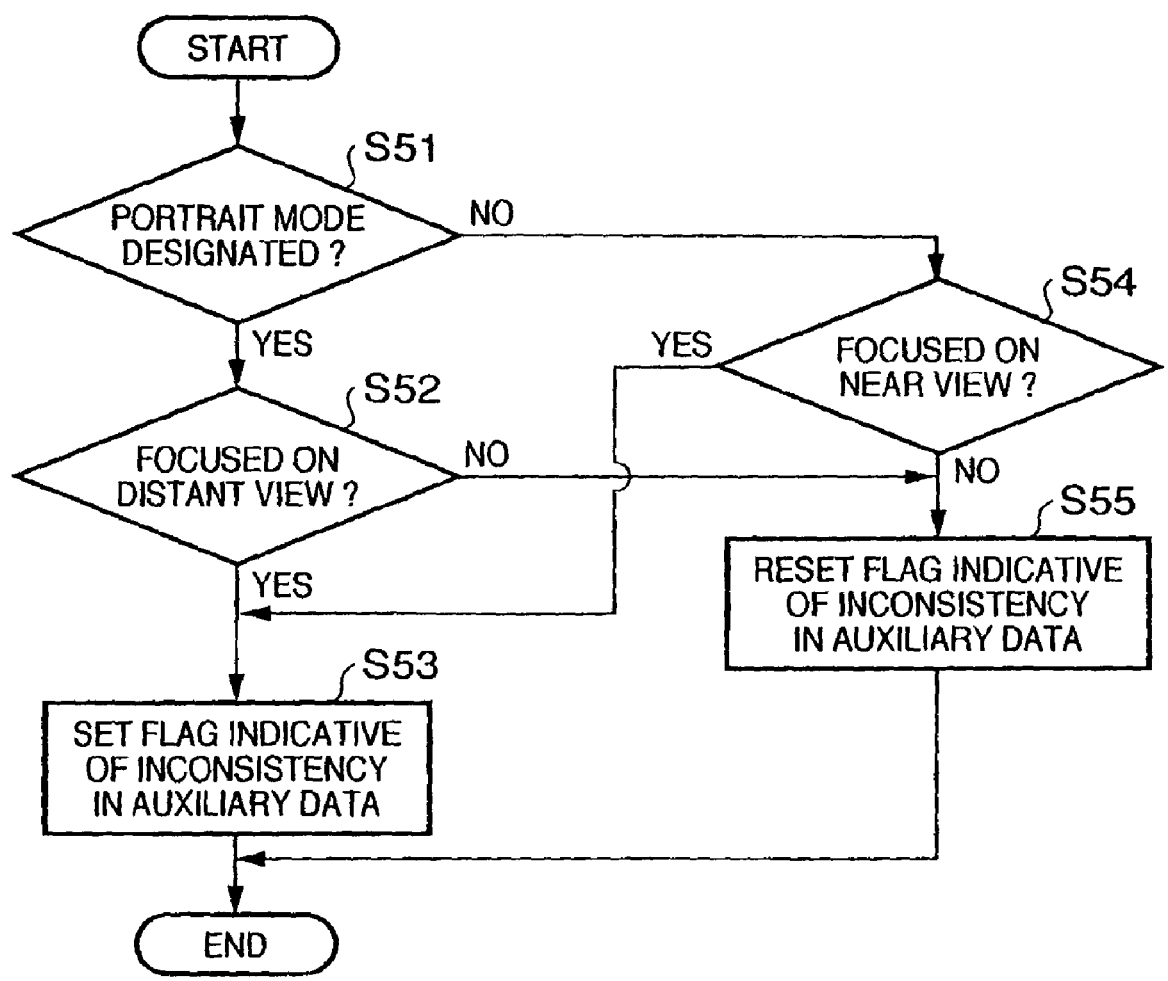
FIG. 7 is a flowchart describing a process of analyzing an existence/absence of inconsistency between focal length data and image sensing mode data in step S50 in FIG. 6.

FIG. 7 is a flowchart describing a process of analyzing an existence/absence of inconsistency between the focal length data and image sensing mode data in step S50 in FIG. 6.

Note that the first embodiment provides descriptions with an assumption that attribute data that accompanies an image, i.e., image sensing mode data indicative of whether the image is sensed in a portrait mode or in a landscape mode, and information about whether the focal length is a near view or a distant view, is stored in a predetermined form (not shown).

First, when analysis processing of auxiliary data is started, it is determined whether or not portrait-mode image sensing is designated by checking the image sensing mode designation data stored in the RAM 102 in step S20 (step S51). If YES, it is determined whether or not the sensed image is focused on a distant view by checking the data read in a predetermined area of the RAM 102 in step S40 (step S52). If the sensed image is focused on a distant view, a flag is set in a predetermined flag area of the RAM 102 to indicate that there is inconsistency between the image sensing mode data and auxiliary data (step S53). Then the series of processing in step S50 ends.

As a result of the determination in step S51, if portrait-mode image sensing is not designated, it is determined whether or not the sensed image is focused on a near view by checking the data read in the predetermined area of the RAM 102 in step S40 (step S54). If the sensed image is focused on a near view, the control proceeds to step S53 described above.

If the sensed image is not focused on a distant view as a result of the determination in step S52, or if the sensed image is not focused on a near view as a result of the determination in step S54, the flag is reset in the predetermined flag area of the RAM 102, which is also used in step S53, to indicate that there is no inconsistency between the image sensing mode data and auxiliary data (step S55). Then the series of processing in step S50 ends.

As described above, in step S50, it is analyzed that there is inconsistency in a case where attribute data includes portrait designation but the image is focused on a distant view, or a case where attribute data includes landscape designation but the image is focused on a near view. In the case other than that described above, it is analyzed that there is no inconsistency.

As has been described above, according to the first embodiment, if there is inconsistency between image sensing mode data set by an operator and attribute data (e.g., focal length data) that accompanies an obtained image with regard to a scene including an object of shooting, a cautionary notice is issued to inform the operator that it is necessary to maintain consistency in the information. Therefore, it is possible to prevent occurrence of inappropriate processing, and also prevent occurrence of inappropriate processing in a latter occasion of using the accompanying data.

In the above-described first embodiment, descriptions have been given assuming that the attribute data is focal length data, and that image sensing mode data is a portrait mode or a landscape mode. However, the present invention is not limited to this case. For instance, the attribute data may be of information related to luminance of a scene including an object of shooting, e.g., photometry data, and the image sensing mode data may be of a nightscape mode. In this case, the digital camera 1 is constructed to determine inconsistency in a case where the nightscape mode is designated but the sensed scene is lighter than a predetermined luminance, and a cautionary notice is displayed. The foregoing description is applicable to this case in this manner.

Second Embodiment

Figure 10:
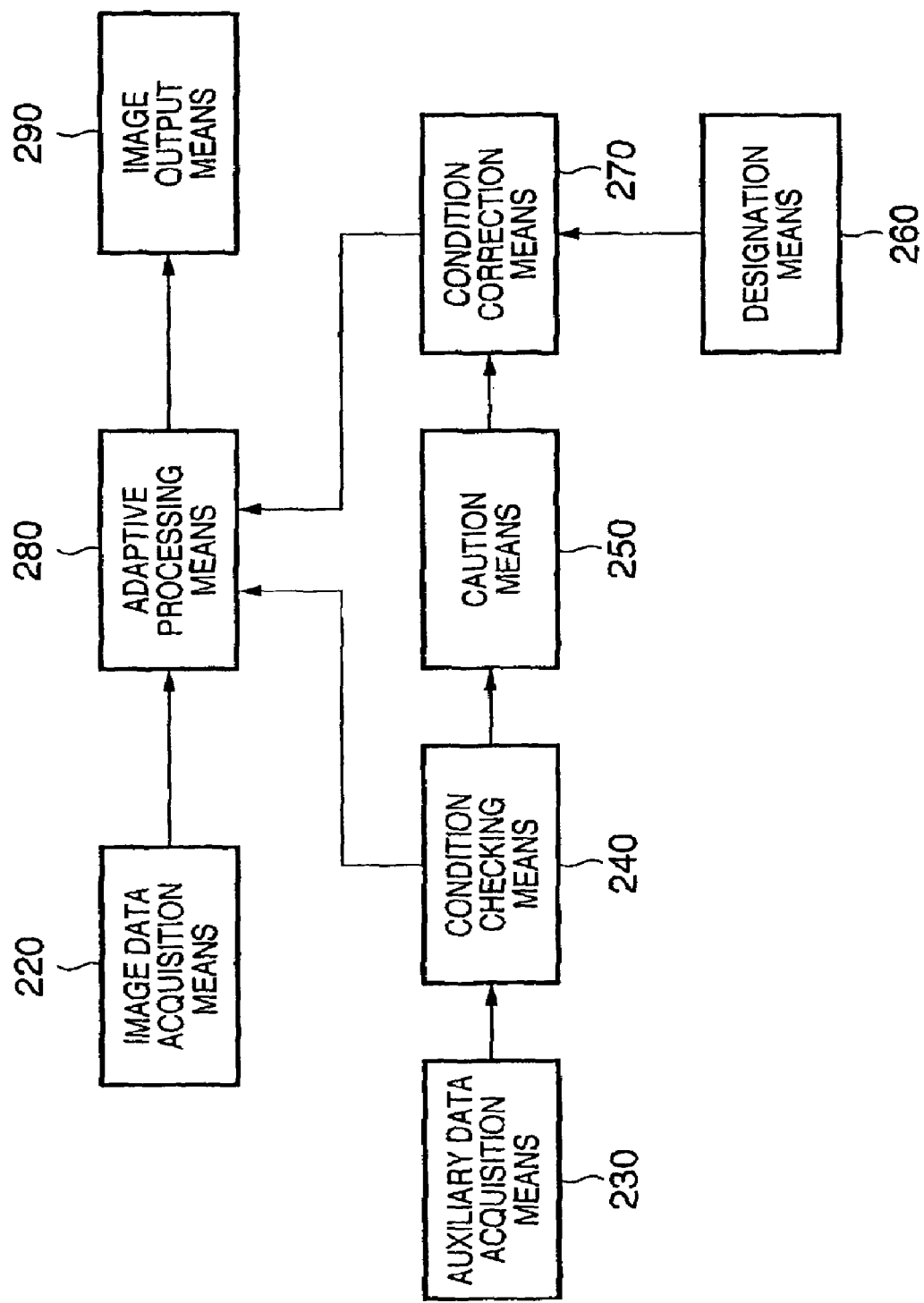
FIG. 10 is a block diagram showing a configuration of an image processing apparatus according to a second embodiment of the present invention.

FIG. 10 is a block diagram showing a functional configuration of an image processing apparatus according to the second embodiment of the present invention. As shown in FIG. 10, the image processing apparatus comprises image data acquisition means 220, auxiliary data acquisition means 230, condition checking means 240, caution means 250, designation means 260, condition correction means 270, adaptive processing means 280, and image output means 290.

The image data acquisition means 220 is constructed with a media drive which reads image data from a removable data storage medium storing image data sensed by a digital camera or the like, or a communication interface unit which inputs image data sensed by a digital camera or the like through a communication path. The image data acquisition means 220 acquires image data obtained by sensing a scene including an object of shooting. The image data acquired by the image data acquisition means 220 is transmitted as digital image data to the adaptive processing means 280.

The auxiliary data acquisition means 230 is constructed with a media drive or a communication interface unit. The media drive reads, from a removable data storage medium storing auxiliary data that accompanies a digital image, data related to a (focal) distance between a camera and an object of shooting obtained by the distance measuring mechanism of a well-known digital camera at the time of sensing a scene including an object of shooting, and image attribute data (Exif data) such as image sensing mode data obtained by designation/selection of an operator of the digital camera using an operation unit, e.g., a selection button, a dial switch or the like (not shown) of the well-known digital camera. The communication interface unit inputs through a communication path, the aforementioned distance data, image attribute data and the like, as auxiliary data that accompanies the digital image.

The auxiliary data including plural types of data, e.g., distance data, image attribute data and the like accompanying the digital image, which is acquired by the auxiliary data acquisition means 230, is transferred to the condition checking means 240.

The condition checking means 240 determines an existence/absence of an image sensing condition that is assumed to be inconsistent among the auxiliary data including plural types of data obtained by the auxiliary data acquisition means 30, and determines the most appropriate adaptive processing.

When the condition checking means 240 determines an existence of a condition that is assumed to be inconsistent, a cautionary notice is given to an operator using the caution means 250 to prompt correction of the condition or termination of the processing.

The designation means 260 is provided for an operator, who has received a caution from the caution means 250, to perform correction of the condition or designation of process termination. When a designation is inputted from the operator through the designation means 260, the condition correction means 270 performs correction on the attribute data or the condition of the most appropriate adaptive processing in accordance with the inputted designation.

The attribute data or the condition of the most adaptive processing corrected by the condition correction means 270 is transferred to the adaptive processing means 280. The adaptive processing means 280 performs adaptive processing on the image data in accordance with the attribute data and the condition of the adaptive processing, thereby obtaining a preferable output image.

Hereinafter, descriptions are provided on an example in which the image processing apparatus according to the present invention is applied to an image processing system, which prints image data sensed by an image sensing device, e.g., a well-known digital camera, by a printer such as a color printer.

Figure 11:
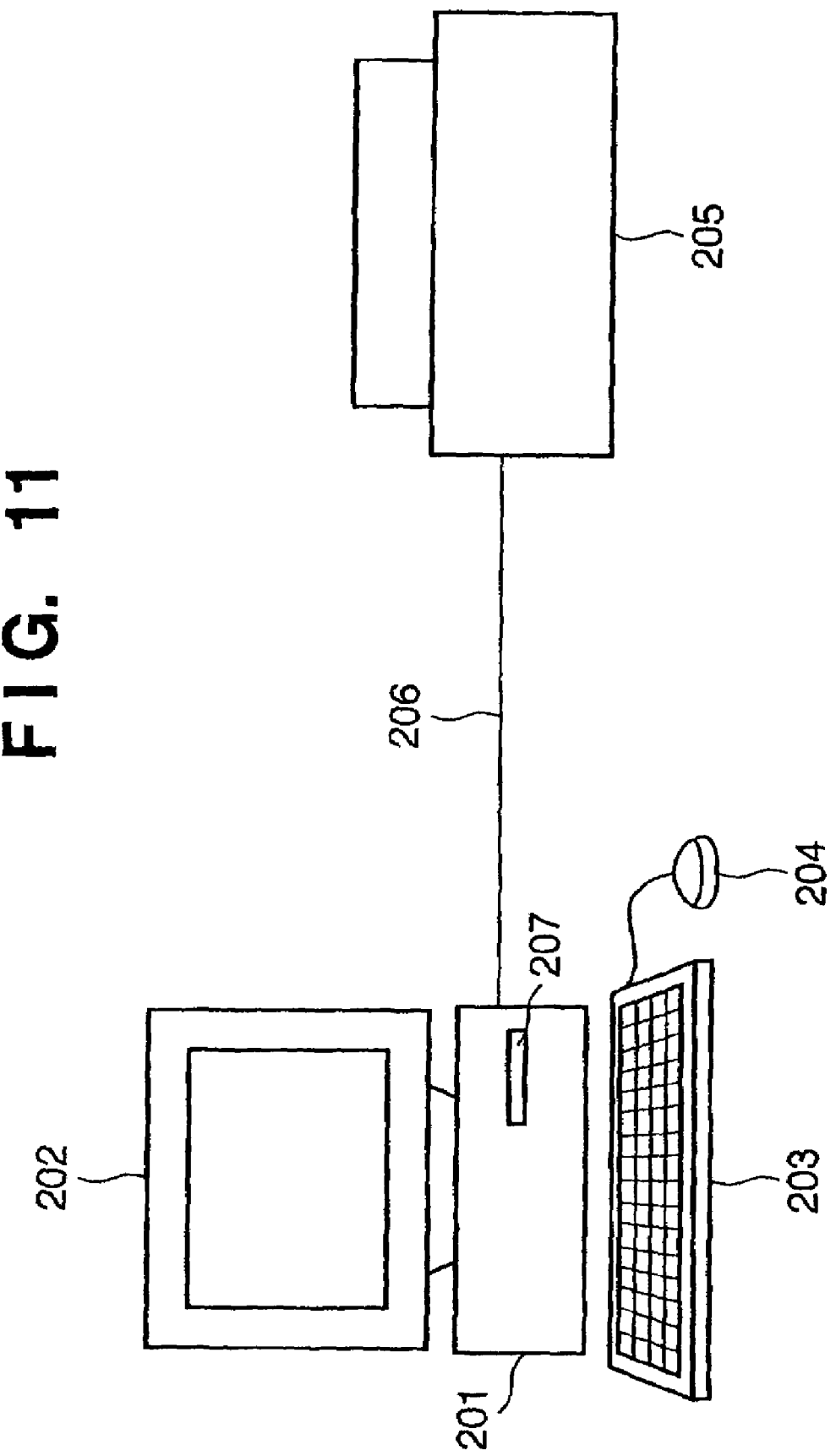
FIG. 11 is a view showing an example of a typical image processing system according to the second embodiment of the present invention.

FIG. 11 shows an image processing apparatus constructed with a PC (personal computer) main unit 201, a monitor display 202, a keyboard 203, a mouse 204, a color printer 205, a printer cable 206 and so on, which is a typical example that constitutes the aforementioned image processing system.

Referring to FIG. 11, numeral 207 denotes a media drive which reads image data and auxiliary data thereof from a removable data storage medium, storing digital image data sensed by a well-known digital camera and auxiliary data that accompanies the digital image data, such as the (focal) distance data and image attribute data.

The image processing apparatus in FIG. 11 comprises a communication interface unit (not shown) for inputting image data sensed by a digital camera or the like, and auxiliary data thereof through a communication path.

Figure 12:
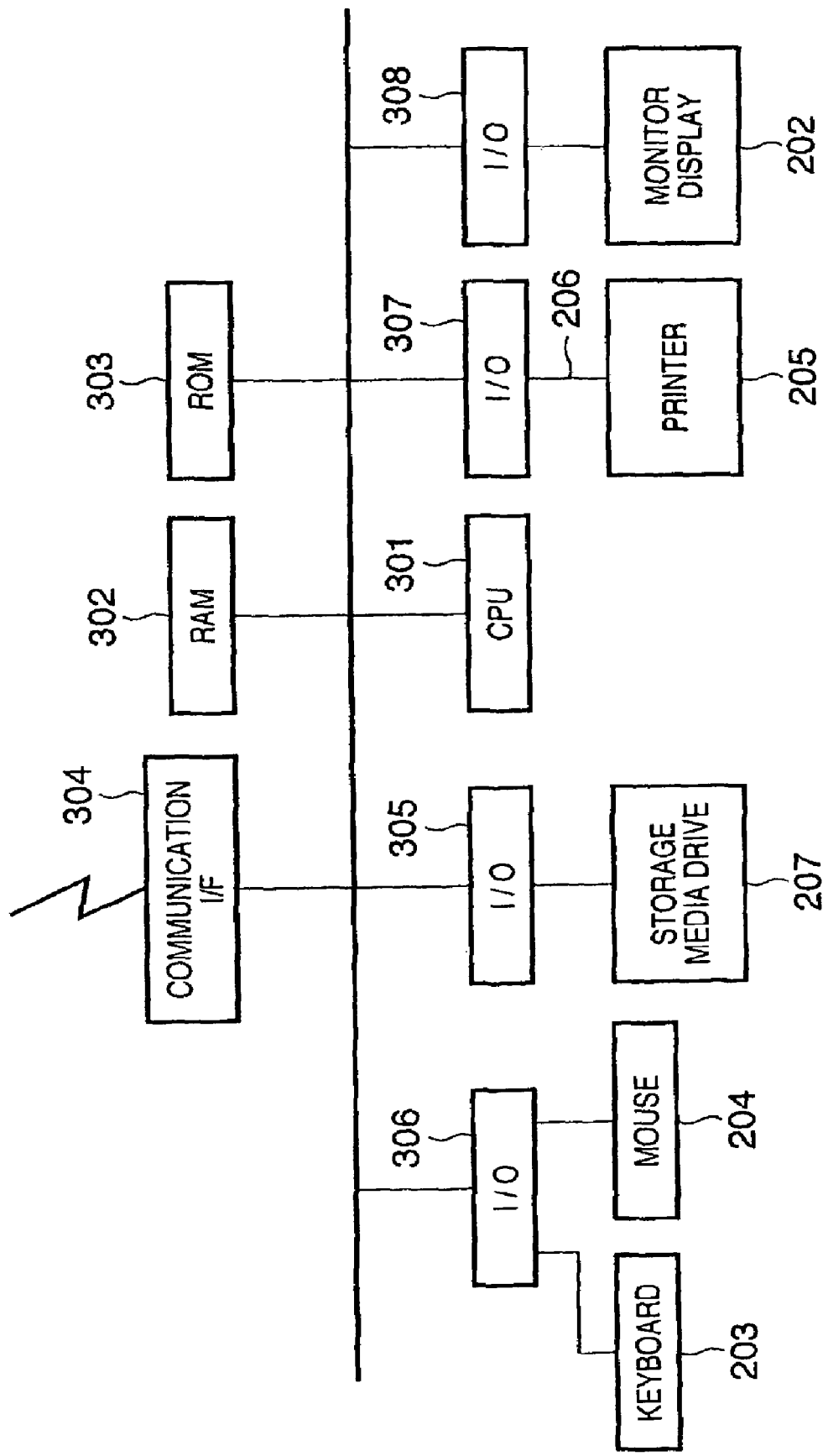
FIG. 12 is a block diagram showing an example of a hardware construction of an image processing apparatus according to the second embodiment of the present invention.

FIG. 12 shows an example of a construction which realizes the image processing apparatus described with reference to FIGS. 10 and 11. In FIG. 12, the communication interface 304, input I/O 305, and storage media drive 207 constitute the image data acquisition means 220 in FIG. 10.

The other input I/O 306, keyboard 203, and mouse 204 in FIG. 12 constitute the designation means 260 in FIG. 10. The output I/O 307, printer cable 206, and printer 205 in FIG. 12 constitute the image output means 290 in FIG. 10. The other output I/O 308 and monitor display 202 constitute the caution means 290 in FIG. 10.

The CPU 301, RAM 302, and ROM 303 operate in accordance with a process procedure according to the flowchart in FIG. 13 which will be described later, thereby constituting the condition checking means 240, condition correction means 270, and adaptive processing means 280 in FIG. 10. Herein, numerals 301 to 308 construct a series of computer system, and constitute the PC (personal computer) main unit 201 in FIG. 11.

Hereinafter, the process procedure is described with reference to the flowchart in FIG. 13. Note that the process procedure is stored in advance in the ROM 303 as a program executable by the CPU 301, and executed by being sequentially read out of the ROM 303 in accordance with the process flow.

Figure 13:
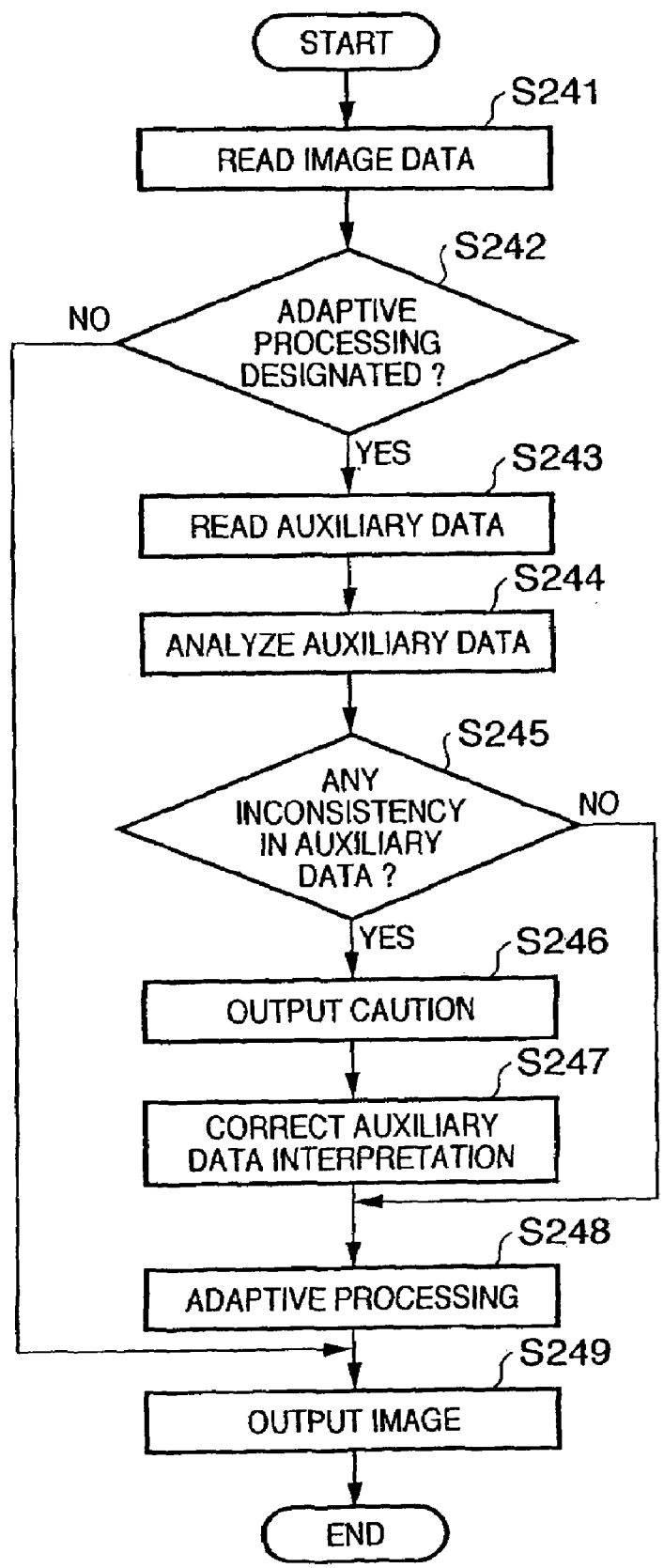
FIG. 13 is a flowchart showing an example of an operation procedure of the image processing apparatus according to the embodiment of the present invention.

Referring to the flowchart in FIG. 13, when the program is executed, digital image data subjected to processing is read and stored in a storage area (not shown) of the RAM 302 in step S241.

The digital image is read from a storage medium, e.g., Compact Flash (registered trademark), a memory card or the like storing the digital image, through the storage media drive 207 and the input I/O 305 connected to the drive, or read from an external unit through the communication I/F 304.

Next in step S242, it is determined whether or not adaptive processing is designated from an operator by using input designation means, e.g., the keyboard 203, mouse 204 or the like, connected to the input I/O 306. If NO, the control proceeds to step S249 where the image data read in step S241 is outputted to the printer 205 connected to the output I/O 307 without performing adaptive processing, and the series of processing ends.

Meanwhile, if adaptive processing is designated in step S242, the control proceeds to step S243. In step S243, auxiliary data that accompanies the digital image data subjected to processing, which is read in step S241, is read and stored in another storage area (not shown) of the RAM 302.

As similar to the above-described step, the auxiliary data is read from a storage medium, e.g., Compact Flash (registered trademark), a memory card or the like storing the auxiliary data, through the storage media drive 207 and the input I/O 305 connected to the drive, or read from an external unit through the communication I/F 304. Then, the control proceeds to step S244.

In step S244, it is analyzed whether or not there is inconsistency in the auxiliary data read in step S243. As a result of the analysis, if there is inconsistency in the auxiliary data, a flag indicative of the inconsistency is set in a predetermined storage area of the RAM 302. If there is no inconsistency, the flag is reset and the control proceeds to step S245. Note that the analysis of auxiliary data in step S244 will be further described later.

In step S245, the flag which has been set or reset in step S244 is referred to determine whether or not there is inconsistency in the auxiliary data. If there is inconsistency as a result of the determination, the control proceeds to step S246; otherwise, the control proceeds to step S248.

In step S246, a cautionary notice is displayed on the monitor display 202 connected through the output I/O 308 to inform that there is inconsistency in the auxiliary data and that it is necessary to maintain consistency in the auxiliary data to perform adaptive processing on the image data, and prompt the operator to designate a correct interpretation of the inconsistent auxiliary data. The caution and prompting a designation input will be further described later. Upon completion of processing in step S246, the control proceeds to step S247.

In step S247, in response to the designation of a correct interpretation from the operator, the auxiliary data is interpreted accordingly and the control proceeds to step S248.

In step S248, adaptive processing in accordance with the interpretation of the auxiliary data is performed on the image data inputted in step S241, and the result is stored in the RAM 302. Upon completion of the processing in step S248, the control proceeds to step S249.

In step S249, the image stored so far in the RAM 302 is outputted to the printer 205 through the output I/O 307, and the series of processing ends.

Figure 14:
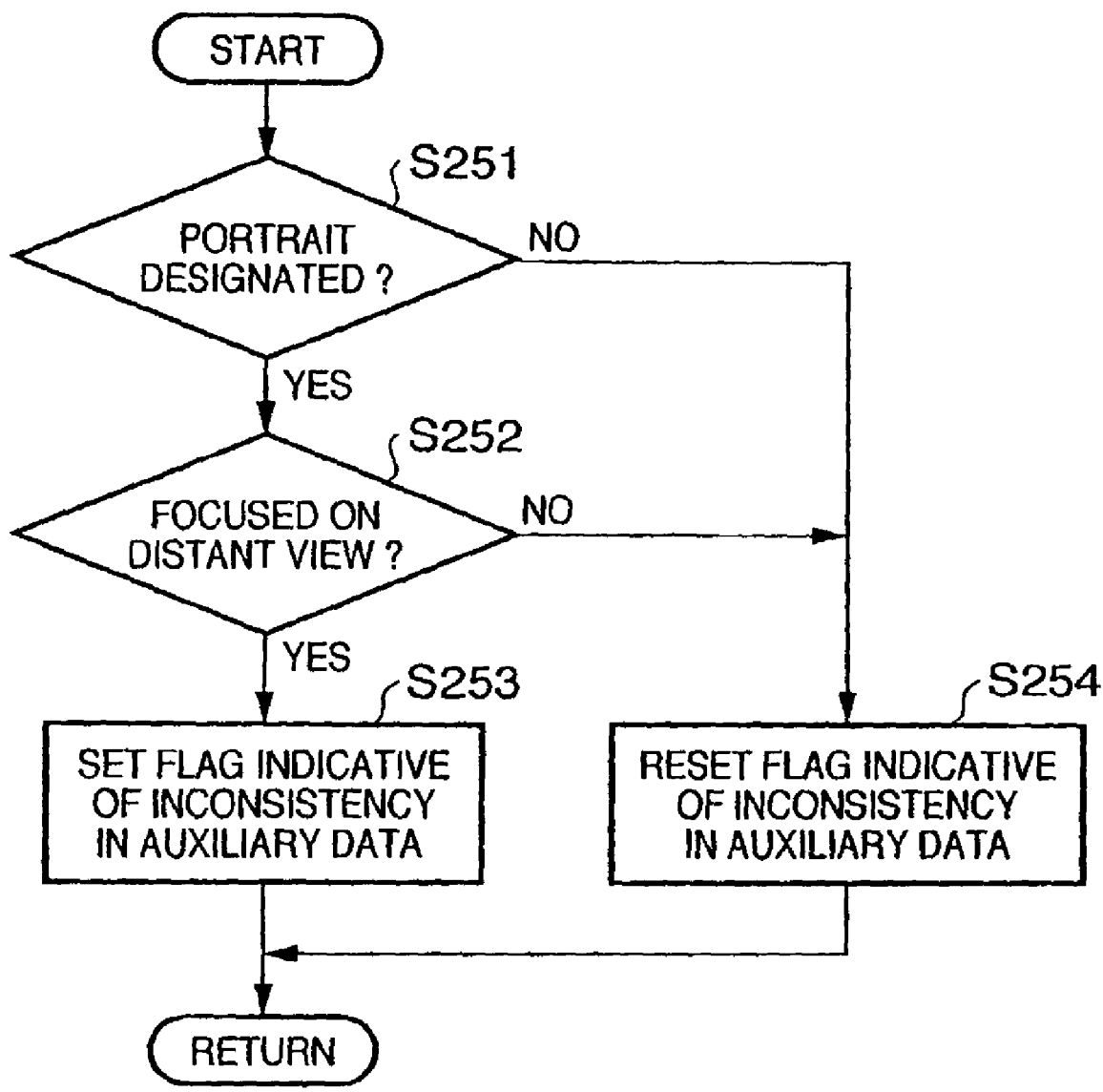
FIG. 14 is a flowchart showing an example of auxiliary data analysis processing.

Next, supplementary descriptions are provided on the analysis of auxiliary data in step S244, with reference to the flowchart in FIG. 14. Note that the second embodiment provides descriptions with an assumption that attribute data that accompanies an image, i.e., image sensing mode data indicative of whether the image is sensed in a portrait mode (whether or not processing as a portrait is desired), and information about whether the focal length is a distant view, is stored in a predetermined form (not shown).

Referring to FIG. 14, when the analysis of auxiliary data is started, it is determined in step S251 whether or not a portrait is designated by referring to a predetermined area of the attribute data read and stored in the RAM 302 in step S243.

As a result of the determination, if a portrait is designated, the control proceeds to step S252; otherwise, the control proceeds to step S254. In step S252, it is determined whether or not the image is focused on a distant view, by referring to a predetermined area of the attribute data read and stored in the RAM 302 in step S243.

As a result of the determination, if the image is focused on a distant view, the control proceeds to step S253; otherwise, the control proceeds to step S254. In step S253, a flag indicative of inconsistency in the auxiliary data is set in a predetermined flag area of the RAM 302, and the series of processing in step S244 ends.

Meanwhile, in step S254, the flag in the predetermined flag area of the RAM 302, which is also used in step S253, is reset to indicate that there is no inconsistency in the auxiliary data, and the series of processing in step S244 ends.

As described above, in step S244, it is analyzed that there is inconsistency in a case where auxiliary data includes portrait designation but the image is focused on a distant view. In the case other than that described above, it is analyzed that there is no inconsistency. Hereinafter, supplementary descriptions are provided on giving a caution and prompting a designation input in step S246.

FIG. 15 shows an example of a caution displayed on the monitor display 202 in step S249. The caution screen in FIG. 15 warns an operator that there is inconsistency in the auxiliary data and that it is necessary to maintain consistency in the auxiliary data to perform adaptive processing on the image data inputted in step S241, and prompts the operator to designate a correct interpretation of the inconsistent auxiliary data.

After the screen shown in FIG. 15 is displayed, the caution screen shown in FIG. 16 is displayed. A correct interpretation of the inconsistent auxiliary data is designated by the operator by operating the virtual button 601 or 602 in FIG. 15 displayed on the monitor display 202, with the mouse 204 serving as designation input means.

More specifically, if the first virtual button 601 is clicked, adaptive processing for a portrait is performed in step S248, whereas if the button 602 is clicked, adaptive processing for an image other than a portrait is performed in step S248 on the image data inputted in step S241.

The adaptive processing performed in step S248 is now described. As disclosed in the aforementioned Japanese Patent Application Laid-Open (KOKAI) No. 2001-167260, for a portrait, correction is performed so as to achieve more preferable exposure and color for a complexion of a person compared to a case of other images. For a landscape, correction is performed so as to emphasize blueness of a sky. For an image other than a portrait or a landscape, predetermined automatic correction is performed based on a luminance and a color of the entire image, regardless of characteristics of an object of shooting in the image.

Third Embodiment

To display a cautionary notice shown in FIG. 15 in the second embodiment and prompt an operator to input designation, the screen shown in FIG. 16 having three virtual buttons: the first to third virtual buttons 700 to 702, may be displayed in place of the one in FIG. 15. In a case where the second or third virtual buttons 701 or 702 is clicked, the processing is performed in the similar manner to the case where the virtual button 601 or 602 in FIG. 15 is clicked.

The processing control may be constructed to terminate the image output operation and end the series of operation when the first virtual button 700 is clicked. The process procedure in this case is described with reference to the flowchart in FIG. 17. In the flowchart in FIG. 17, step S465 is added between step S246 and step S247 of the flowchart in FIG. 13. In step S465, the series of processing ends when an operator clicks the first virtual button 700. Besides step S465, the same processing as that in FIG. 13 is performed; therefore, detailed descriptions are omitted.

Note that the above descriptions have been provided with an assumption that attribute data that accompanies an image is attached to the image at the time of performing image sensing by a digital camera. However, the attribute data may be attached to an image by using an image-editing application software or the like after an image sensing operation.

The object of the present invention can be achieved by providing program codes of software, which realizes the above-described functions of the embodiments, to a computer or a CPU, reading the program codes by the computer or CPU, and executing the program.

In this case, the program codes are supplied directly from a recording medium recording the program (not shown), or supplied by being downloaded from a computer (not shown) or a database or the like connected to the Internet, a commercial network, a local area network and the like.

Furthermore, the program codes may be provided in a form that the above-described functions of the embodiments are realized by a computer. The form may be of object codes, a program executed by an interpreter, script data supplied to an operating system (OS), and the like.

Furthermore, the object of the present invention can also be achieved by providing a computer with a recording medium, recording program codes of software realizing the above-described functions of the embodiments, reading the program codes stored in the recording medium by the computer, and executing the program.

The recording medium providing the program codes may be, e.g., RAM, NV-RAM, a floppy disk (registered trademark), an optical disk, a magneto-optical disk, CD-ROM, MO, CD-RW, DVD (DVD-ROM, DVD-RAM, DVD-RW, DVD+RW), a magnetic tape, a non-volatile type memory card, and other ROMs that can store the above-described program.

Furthermore, the present invention also includes a case where, after the program codes read from the storage medium are written in a function expansion card which is inserted into a digital camera or in a memory provided in a function expansion unit which is connected to the digital camera, a CPU or the like contained in the function expansion card or unit performs a part or the entire processes in accordance with designations of the program codes and realizes functions of the above embodiments.

The present invention is not limited to the above embodiments and various changes and modifications can be made within the spirit and scope of the present invention. Therefore, to apprise the public of the scope of the present invention, the following claims are made.

What is claimed is:

1. An image processing apparatus comprising:
    an image data acquisition unit for reading out image data from a removable data storage medium storing the image data;
    an auxiliary data acquisition unit for reading out auxiliary data from the removable data storage medium, the auxiliary data accompanies the image data, the auxiliary data includes plural types of data;
    a condition checking unit for checking whether or not there is an inconsistent condition by comparing the different types of the auxiliary data which are accompanied with the same image data;
    a caution unit for giving a caution in a case where said condition checking unit determines that there is the inconsistent condition; and
    a condition correction unit for correcting the auxiliary data in accordance with a designation by an operator of the image processing apparatus.

2. The image processing apparatus according to claim 1, wherein the image data is generated by an image sensing of an object by a digital camera, the auxiliary data includes at least the data related to an image sensing mode at the time of the image sensing of the object by the digital camera and the data related to a distance from the digital camera to the object at the time of the image sensing of the object by the digital camera.

3. The image processing apparatus according to claim 2, wherein the inconsistent condition indicates a case where the data related to the distance specifies a short distance and the data related to the image sensing mode specifies the image sensing mode mainly provided for a long distance, or a case where the data related to the distance specifies a long distance and the data related to the image sensing mode specifies the image sensing mode mainly provided for a short distance.

4. An image processing method comprising:
- an image data acquisition step for reading out image data from a removable data storage medium storing the image data;
- an auxiliary data acquisition step for reading out auxiliary data from the removable data storage medium, the auxiliary data accompanies the image data, the auxiliary data includes plural types of data;
- a condition checking step for checking whether or not there is an inconsistent condition by comparing the different types of the auxiliary data which are accompanied with the same image data;
- a caution step for giving a caution in a case where said condition checking step determines that there is the inconsistent condition; and
- a condition correction step of correcting the auxiliary data in accordance with a designation by an operator who performs the image processing.

5. The image processing method according to claim 4, wherein the image data is generated by an image sensing of an object by a digital camera, the auxiliary data includes at least the data related to an image sensing mode at the time of the image sensing of the object by the digital camera and the data related to a distance from the digital camera to the object at the time of the image sensing of the object by the digital camera.

6. The image processing method according to claim 5, wherein the inconsistent condition indicates a case where the data related to the distance specifies a short distance and the data related to the image sensing mode specifies the image sensing mode mainly provided for a long distance, or a case where the data related to the distance specifies a long distance and the data related to the image sensing mode specifies the image sensing mode mainly provided for a short distance.

7. A non-transitory computer-readable storage medium embodying a computer program causing a computer to execute the image processing method described in claim 4.

* * * * *